United States Patent [19]
Ito et al.

[11] 4,020,449
[45] Apr. 26, 1977

[54] SIGNAL TRANSMITTING AND RECEIVING DEVICE

[75] Inventors: Tetsuo Ito, Hitachi; Motohisa Nishihara, Katsuta, both of Japan

[73] Assignee: Hitachi, Ltd., Japan

[22] Filed: May 19, 1975

[21] Appl. No.: 578,767

[30] Foreign Application Priority Data

May 22, 1974 Japan ............................ 49-56484
June 5, 1974 Japan ............................ 49-62884

[52] U.S. Cl. ........................... 340/15; 340/5 R; 340/171 PF
[51] Int. Cl.[2] ........................... H04B 11/00
[58] Field of Search ........ 340/5 R, 171 PF, 171 A, 340/148, 16 C, 15

[56] References Cited
UNITED STATES PATENTS

| | | | |
|---|---|---|---|
| 3,289,152 | 11/1966 | McIlwraith et al. ............... | 340/5 R |
| 3,305,634 | 2/1967 | Rusicik ............................ | 340/5 R X |
| 3,530,434 | 9/1970 | Stites et al. .................... | 340/171 PF |
| 3,723,956 | 3/1973 | Carman ............................ | 340/5 R |
| 3,860,913 | 1/1975 | Weeks, Jr. et al. ............ | 340/171 PF |
| 3,882,466 | 5/1975 | Poorvin .......................... | 340/171 PF |
| 3,939,465 | 2/1976 | Helton et al. .................. | 340/5 R |

OTHER PUBLICATIONS

"Diver Telemetry System", Sperry Eng. Rev., vol. 19, No. 3, 1966, pp. 25–30.

*Primary Examiner*—Richard A. Farley
*Attorney, Agent, or Firm*—Craig & Antonelli

[57] ABSTRACT

A signal to be transferred comprises a plurality of patterns each including a time region containing a plurality of frequency signals and a time region containing no frequency signal. When a signal to be transmitted is given in the form of numeric information, this signal is automatically patterned by a transmitter unit to provide a period containing predetermined frequency signals and a period containing no frequency signal. A receiver unit reproduces the sequentially transmitted frequency signals on the basis of the reception of the first transmitted frequency signal.

5 Claims, 12 Drawing Figures

FIG. 3
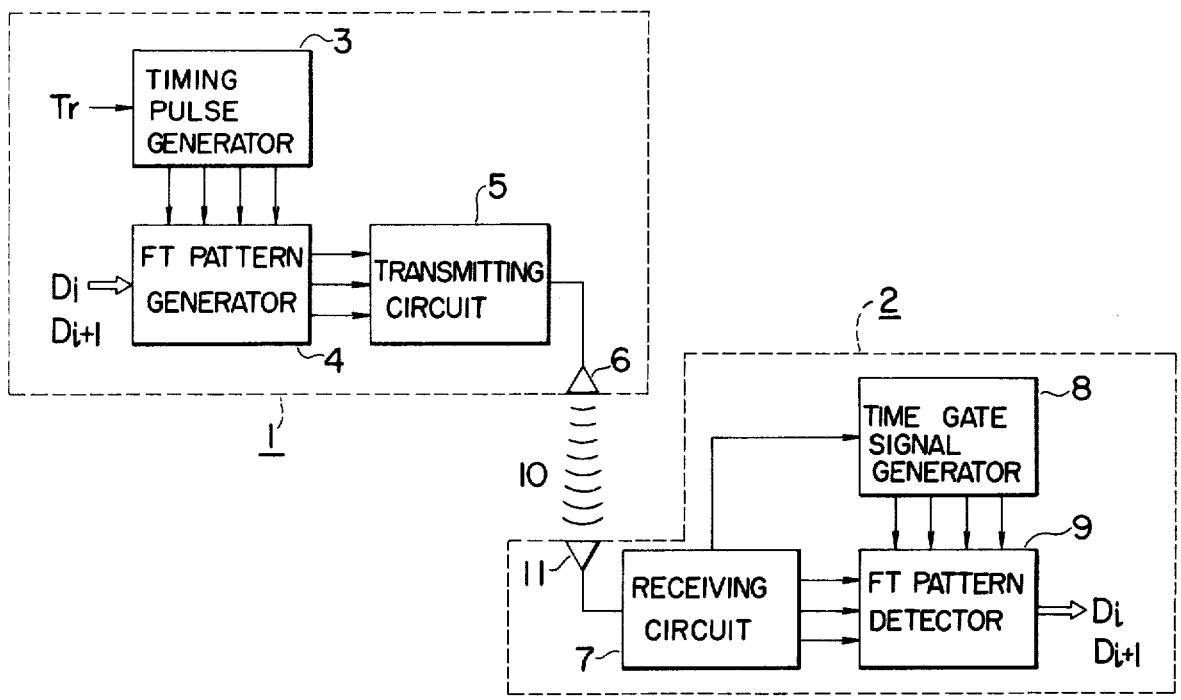
FIG. 5
| FT PATTERN PA$_i$ | PERMUTATION OF NUMBER K$_1$, K$_2$, K$_3$ | NUMERIC VALUE N$_i$ |
|---|---|---|
| PA$_0$ | 0 . 0 . 0 | 0 |
| PA$_1$ | 0 . 0 . 1 | 1 |
| PA$_2$ | 0 . 1 . 0 | 2 |
| PA$_3$ | 0 . 1 . 1 | 3 |
| PA$_4$ | 0 . 2 . 0 | 4 |
| PA$_5$ | 0 . 2 . 1 | 5 |
| PA$_6$ | 1 . 0 . 0 | 6 |
| PA$_7$ | 1 . 0 . 1 | 7 |
| PA$_8$ | 1 . 1 . 0 | 8 |
| PA$_9$ | 1 . 1 . 1 | 9 |
| PA$_{10}$ | 1 . 2 . 0 | 10 |
| PA$_{11}$ | 1 . 2 . 1 | 11 |
| PA$_{12}$ | 2 . 0 . 0 | 12 |
| PA$_{13}$ | 2 . 0 . 1 | 13 |
| PA$_{14}$ | 2 . 1 . 0 | 14 |
| PA$_{15}$ | 2 . 1 . 1 | 15 |
| PA$_{16}$ | 2 . 2 . 0 | 16 |
| PA$_{17}$ | 2 . 2 . 1 | 17 |
FIG. 7
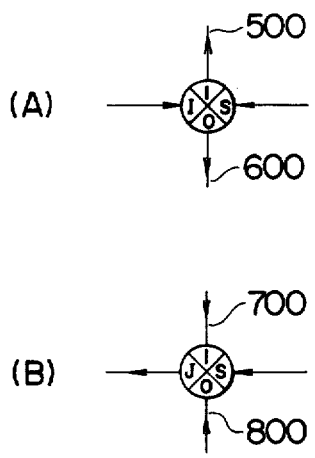

SIGNAL TRANSMITTING AND RECEIVING DEVICE

BACKGROUND OF THE INVENTION

1. Field of the Invention

The present invention relates to the transferring of a signal in water or in oil and more particularly to a signal transmitting and receiving device using ultrasonic wave.

2. Description of the Prior Art

The present inventors have already suggested that the combination of a plurality of frequency signals and a plurality of unit time regions should be used for the transferring of information in a signal transmitting and receiving device using ultrasonic wave.

This information transferring system using the combination of frequencies and time regions is explained assuming that a frequency-time matrix (hereinafter referred to as FT matrix) is comprised by m different frequency signals $f_1, f_2, f_3, \ldots f_m$ in a row and n unit time regions $t_1, t_2, t_3, \ldots t_n$ in a column. When the m frequency signals are selected on the condition that the unit time region $t_1$ always contains one frequency signal and the same frequency signal is not used in two or more of the n unit time regions, the total number of combination patterns of frequencies and unit time regions (hereinafter referred to as FT patterns) is expressed as follows.

$$M = m \cdot (n-1)! / (n-m)! \qquad (1)$$

In the transferring of information by the use of such FT patterns, it is common practice that the operators at the transmitting and receiving sides determine previously that each of the FT patterns represents a specific unit information piece such as an alphabetical character or a numerical value. The operator at the transmitting side resolves any given information into a plurality of unit information pieces and sequentially converts the unit information pieces into FT patterns in accordance with which frequency signals are sequentially oscillated in the respective unit time regions. The operator at the receiving side can know the contents of the information by decoding the frequency signals sequentially.

The above-described system has the advantage that each unit information piece is transferred within a shorter time as compared with other systems such as an FSK (Frequency Shift Keying) system, especially in the transferring of information underwater and that errors can be easily detected. This provides a possibility for the realization of communications with high speed and high reliability. Another advantage of the above-described system is the elimination of the inconvenience resulting from the fixing of FT patterns as is seen in RADAS (Random Access Discrete Address System) similar to the system under consideration. Incidentally, the inconvenience of the RADAS is that since different FT patterns are allotted to different receiving stations with which a transmitting station interchanges information, the transmitting station is required to transmit information including the allotted FT pattern to the associated receiving station. This limits the receiving stations to which the information is capable of being transmitted, with the result that it is impossible to transfer specific information to a plurality of receiving stations at the same time, thus restricting the field of applications of the system.

SUMMARY OF THE INVENTION

It is an object of the present invention to provide a signal transmitting and receiving device comprising a transmitter unit and a receiver unit suitable for the transferring of information by the use of FT patterns.

In order to achieve this object, the present invention is characterized in that the transmitter unit is adapted to transmit automatically FT patterns in accordance with information when the information is given in an appropriate numeric form, while the receiver unit initiates the operation of reproducing the FT patterns automatically when a frequency signal in the first unit time region of the FT patterns is received.

BRIEF DESCRIPTION OF THE DRAWINGS

FIG. 3 is a block diagram for explaining the fundamental construction of the signal transmitting and receiving device according to the invention.

FIGS. 4 and 5 are diagrams showing the relation between numeric information and FT patterns used in the transmitter unit of the signal transmitting and receiving device according to the invention.

FIGS. 7 and 8 diagrams for explaining one of the blocks in the embodiment of FIG. 6.

DETAILED DESCRIPTION OF THE PREFERRED EMBODIMENTS

Prior to the description of the signal transmitting and receiving device according to the present invention, FT patterns will be explained below.

Figure 1:
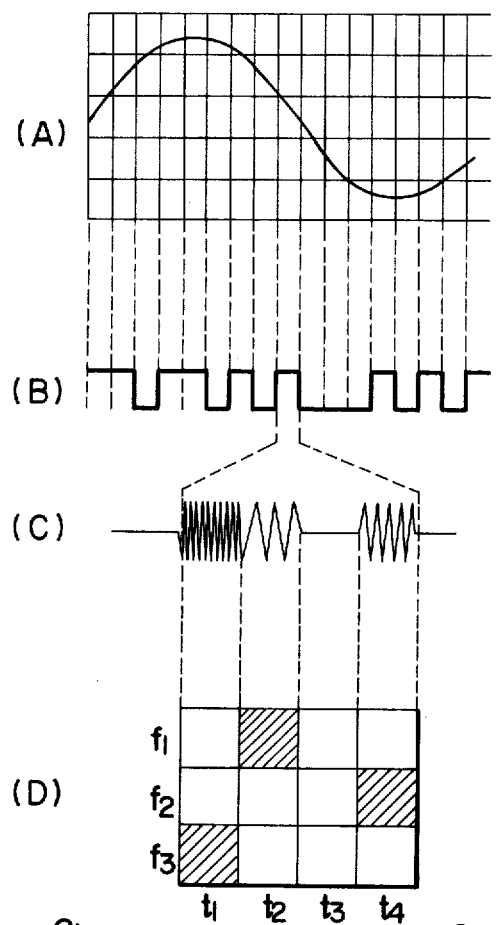
FIG. 1 is a diagram for explaining the positioning of FT patterns for transfer used in the present invention.

Assume that a waveform shown in A of FIG. 1 is a sound wave and the abscissa and ordinate represent time and amplitude respectively. This sound wave is sampled at a predetermined cycle and converted into a train of pulse signals as shown in B of FIG. 2. In the illustrated example, the sound wave is deltamodulated into a train of pulse signals. Each of the pulses included in this pulse signal train comprises a group of frequency signals including three different frequency signals of, for example, $f_1, f_2$ and $f_3$ as shown in C of FIG. 1. In this way, the group of frequency signals may be expressed by a FT matrix comprised of the frequency signals and the unit time regions $t_1$ to $t_4$ where the frequency signals are present, as shown in D of FIG. 1.

By way of explanation, the FT matrix under consideration comprises the frequencies $f_1, f_2$ and $f_3$ and the unit time regions $t_1, t_2, t_3$ and $t_4$, and the frequency signals are present in the unit time regions to which the shadowed sections belong in (D) of FIG. 1. The patterns produced from this FT matrix are called FT patterns which are obtained by the number shown by the equation (1) depending upon the numbers of frequency signals and unit time regions.

Figure 2:
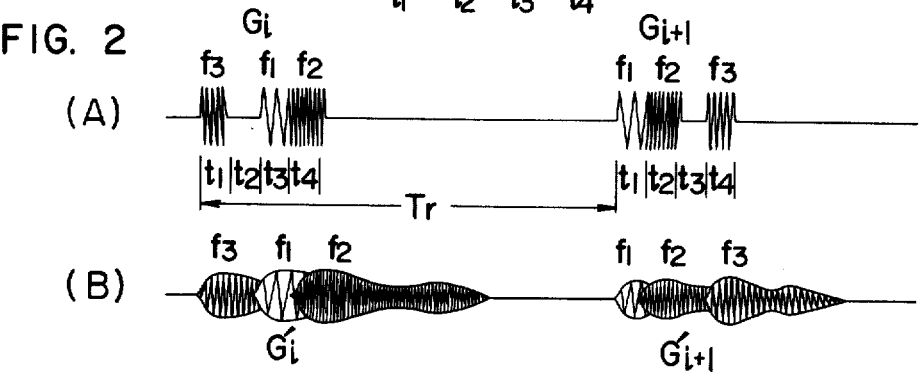
FIG. 2 is a diagram for explaining the manner in which the FT patterns are received by the receiver unit.

In transmitting information, one of the unit information pieces making up the contents of information is first converted into a signal group $G_i$ as shown in (A) of FIG. 2 in accordance with a settlement determined previously between operators at the transmitting and receiving sides. For convenience's sake, the signal group $G_i$ is assumed to have the same construction as the FT pattern shown in FIG. 1. The signal group $G_i$ is changed to the waveform of signal group $G_i'$ shown in (B) of FIG. 2 due to the multi-path effect. The changed signal is received by a receiver unit. The rise points of the frequency signals making up the signal group are not affected by the multi-path effect since they take the shortest route to the receiving side. Therefore, the time relation between the respective rise points of the frequency signals at the receiving side is considered to remain the same as that at the transmitting side. For this reason, it is possible to reproduce the FT pattern as shown in FIG. 1 and to decode the received unit information piece by detecting the time relation between the rise points of the frequency signals. Another unit information piece following the above-mentioned unit information piece is transmitted in the form of signal group $G_{i+1}$ as shown in FIG. 2. In this case, it is necessary to provide a transmitting interval $T_r$ of not less than a certain length of time between the signal groups in order to prevent the tail of the signal group $G_i$ due to the multi-path effect from overlapping on the next signal group $G_{i+1}$. Thus, the information to be transmitted is transformed into a plurality of unit information pieces at the transmitting side and then each unit information piece is then converted into a plurality of frequency signal groups in accordance with the FT patterns determined between the operators at the transmitting and receiving sides. At the receiving side, the received frequency signal groups are sequentially converted into the corresponding FT patterns so that the unit information pieces represented by the respective patterns are read, thereby making it possible to know the whole information received.

In accordance with this method, the unit information piece can be transmitted with a considerably short period of time since the frequency signals are superimposed in a relation slightly shifted to each other, and it is possible to greatly improve the transfer speed since the transmitting intervals $T_r$ between the signal groups can be reduced.

The fundamental principle of the information transmitting and receiving device according to the present invention is shown in FIG. 3. Reference numeral 1 shows a transmitter unit and numeral 2 a receiver unit. The transmitter unit 1 includes a timing pulse generator 3, an FT pattern generator 4, a transmitting circuit 5 and a wave transmitter 6. The receiver unit 2, on the other hand, includes a receiving circuit 7, a time gate signal generator 8 and an FT pattern detector 9. Numeral 10 shows a space.

First, when the FT pattern generator 4 of the transmitter unit 1 receives the unit information piece $D_i$ to be transmitted, the FT pattern generator 4 converts the unit information piece $D_i$ into a corresponding FT pattern such as shown in FIG. 1. The transmitting circuit 5 responds to a timing pulse from the timing pulse generator 3 to generate each of the frequency signals in accordance with the particular FT pattern, whereupon the wave transmitter 6 transmits in a form of ultrasonic wave the frequency signal group $G_i$ as shown in A of FIG. 2.

After being propagated under water 10, the signal group $G_i$ is picked up by the wave receiver 11 in the form of signal group $G_i'$ having the waveform as shown in B of FIG. 2. The signal group $G_i'$ is amplified and separated into frequency components by the receiving circuit 7. The unit time region to which each of the rise points of the frequency components belongs is detected by the FT pattern detector 9 using a gate signal produced from the time gate signal generator 8, so that the FT pattern is reproduced. By reading this FT pattern, the received unit information piece $D_i$ is identified. Next, the unit information piece $D_{i+1}$ following the unit information piece $D_i$ is transmitted and received by similar processes at a proper interval $T_r$ by utilizing another frequency signal group $G_{i+1}$ such as shown in FIG. 2.

In the event that one FT pattern is allotted to one unit information piece as in the present case, the expression of each unit information piece in the form of a numeric signal similar to a binary number is generally preferable as it simplifies the construction of the device. However, there is available no device whereby the unit information piece expressed in the form of a numeric signal is capable of being automatically converted into an FT pattern, so that the conventional device requires the operator at the transmitting side to set each pattern by reference to a conversion table or the like. This requires a considerable conversion time, often causes conversion errors and adversely affects the high speed and reliability of the device. Also, such a conventional method is not compatible with computers handling information in a form of binary number, and therefore quite limited in applications.

The transmitter unit of the signal transmitting and receiving device according to the present invention is developed to overcome the above-described disadvantages and is characterized in that a plurality of unit information pieces expressed in a form of numeric information is automatically converted into predetermined FT patterns so that predetermined frequency signals are sequentially transmitted.

The fundamental principle of the transmitter unit according to the invention lies in that (1) the elements of the FT matrix are numbered according to a certain rule and the numbers of the elements associated with the frequency signals are picked up, so that FT patterns are identified and discriminated utilizing the fact that the permutations or arrangements of the numbers of the picked-up elements differ with the FT patterns, and (2) each number making up each permutation of the picked-up FT pattern is multiplied by an appropriate constant and the results of multiplications are added to each other, the sum showing a series of different numeric values.

The numbering of the elements will be explained with reference to FIG. 4. The FT matrix of FIG. 4 comprises frequency signals $f_1$, $f_2$ and $f_3$ in rows and the unit time regions $t_1$, $t_2$, $t_3$ and $t_4$ in columns, the three FT patterns (A), (B) and (C) being shown as examples. The shadowed elements indicate the presence of frequency signals as in the case of FIG. 1. The elements are numbered according to the rule mentioned below, with the FT pattern A taken as an example.

(1) It is assumed that the frequency signals $f_1$, $f_2$ and $f_3$ are arranged in the shown order in rows and that the unit time regions $t_1$, $t_2$, $t_3$ and $t_4$ are arranged in that order in columns which in principle are in chronological order.

(2) First, the elements $f_1 t_1$, $f_2 t_1$ and $f_3 t_1$ in column $t_1$ are numbered 0, 1 and 2 respectively, and the number $K_1$ of the element $f_2t_1$ associated with a frequency signal is identified, the number $K_1$ being 1.

(3) As a second process, those elements in the row of the highest order, namely, row $f_1$, among the rows excepting the row including the element $f_2t_1$ found to be associated with a frequency signal by the preceding process, namely, row $f_2$ each of the elements of which is indicated by a leftwardly downward oblique line except the element in column $t_1$, are numbered 0', 1' and 2' respectively, so that the number $K_2$ of the element $f_1t_3$ associated with another frequency signal is checked, the number $K_2$ being 1.

(4) Thirdly, excepting the rows $f_2$ and $f_1$ and the columns $t_1$ and $t_3$ including the elements $f_2t_1$ and $f_1t_3$ found to be associated with the frequency signals by the preceding two processes, namely, excepting the elements indicated by leftwardly downward oblique lines and additionally the element indicated by a rightwardly downward oblique line, the elements of the highest order including and subsequent to the column $t_2$ are numbered 0″ and 1″ respectively in chronological order. Thus, the number $K_3$ of the element $f_3t_4$ associated with a frequency signal is checked, the number $K_3$ being 1.

The permutation of the numbers $[K_1, K_2, K_3]$ obtained by the above-described processes differs with the FT pattern, and it will be seen that the permutations of the numbers shown by the examples (A), (B) and (C) are [1,1,1], [0,0,0] and [2,2,1] respectively. In the case of FIG. 4, incidentally, the processes (3) and (4) above are distinguished from the process (1) by attaching single and double quotation marks respectively to the numbers involved, like 0', 1', ..., 0″, 1″.

Figure 4:
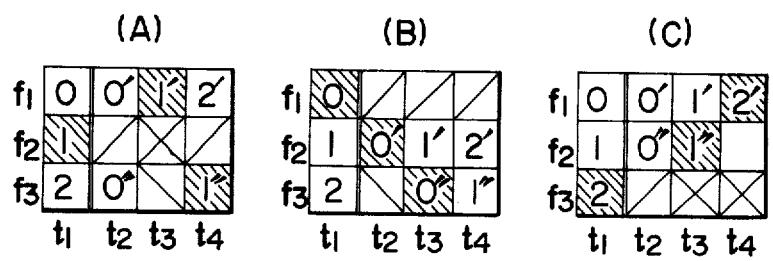

There are still other FT patterns available from the FT matrix shown in FIG. 4, and the total number M of 18 including shown examples is obtained by substituting 3 and 4 respectively into $m$ and $n$ in equation (1). The 18 FT patterns thus obtained are designated as $PA_0, PA_1, \ldots, PA_{17}$ and numbered by following similar processes to those described above, resulting in different permutations of the numbers being obtained as shown in FIG. 5. In this way, various FT patterns are identifiable by the permutations of the numbers thereof.

In the above-mentioned numbering operation, by replacing the word "thirdly" with the words "as a $k$-th process" ($k$ being 2, 3, ..., $m$), and the number $K_3$ with the number $K_k$, the permutations of the numbers $K_1, K_2, \ldots, K_m$ are obtained, which is naturally applicable to general pattern recognition of the FT matrix including $m$ rows and $n$ columns.

Next, the fact that the above-mentioned permutations of numbers are capable of being converted into a series of numeric values will be explained below.

In converting a permutation of numbers into a numeric value, generally, the numbers $K_1, K_2, \ldots, K_m$ are multiplied by the constants $W_1, W_2, \ldots, W_m$ respectively thereby to calculate the sum $N_i$ shown in equation (2) below $$N_i = \sum_{i=1}^{m} K_i W_i \quad (2)$$

By appropriately selecting the value of the constant $K_i$, it is possible to cause the sum $N_i$ to assume a series of numeric values. The appropriate constants $W_i$ referred to above may be expressed by equation (3) below.

$$W_i = (n-1)! / (n-m)! \quad (i = 1, 2, \ldots, m) \quad (3)$$

Referring again to the example of FIG. 5, by substituting the values 3 and 4 into $m$ and $n$ in equation (3) and applying the resulting constants $W_1$, $W_2$ and $W_3$ valued at 6, 2 and 1 respectively to the equation (2), a series of numeric values 0, 1, ..., 17 in Ni are obtained from the permutations of the numbers $PA_0, PA_1, \ldots, PA_{17}$ in FT pattern.

It is thus possible to convert FT patterns into a series of numeric values.

The transmitting unit according to the invention takes advantage of the reverse of the above-mentioned principle in order to convert a series of numeric values into FT patterns. In other words, the numeric values $N_i$ being given, the number of constants included in the value $N_i$ is counted for $W_1, W_2, W_3, \ldots, W_m$ in that order, and the resulting numbers $K_1, K_2, \ldots, K_m$ are arranged in that order thereby to form permutations of the numbers. This process is identical with the process in which the left side of the equation (2) is resolved into the terms of the right side thereof. Next, the FT matrix is numbered in such a manner that the frequency signals are allotted to the elements indicated by the numbers included in the permutations. The numeric values $N_i$ are thus converted into FT patterns systematically on the abovementioned principle.

Figure 6:
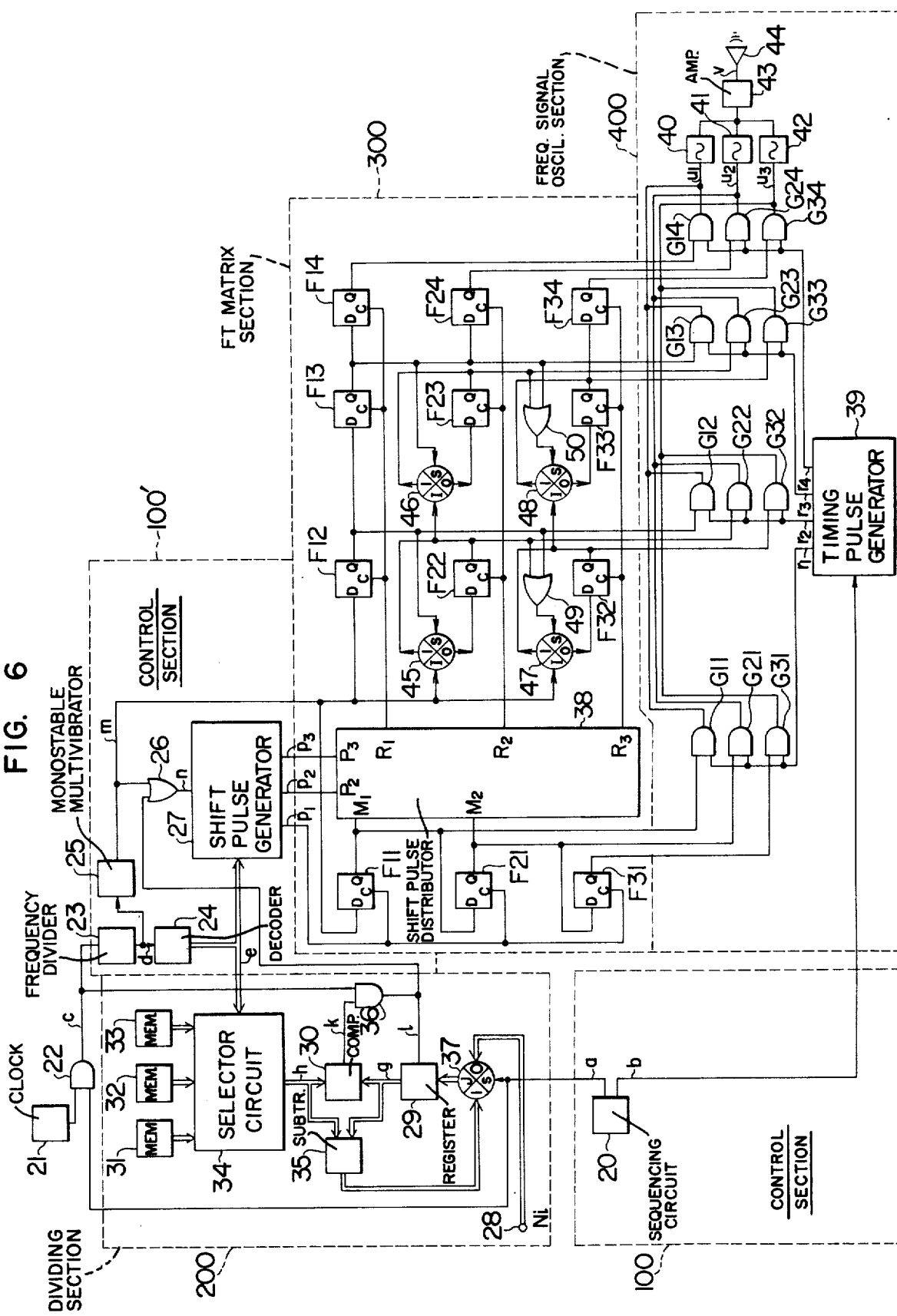
FIG. 6 is a block diagram showing an embodiment of the transmitter unit.

An embodiment of the invention operating on the above-mentioned principle is shown in FIG. 6 and handles, for facilitating the understanding, FT patterns comprising the frequency signals $f_1, f_2$ and $f_3$ and the unit time regions $t_1, t_2, t_3$ and $t_4$ shown in FIG. 4. Roughly, the transmitter unit under consideration comprises control sections 100 and 100', a dividing section 200, a FT matrix section 300 and a frequency signal oscillating section 400. Prior to the explanation of the operation of the transmitter unit under consideration, reference numerals and symbols will be described. Reference numeral 20 shows a sequencing circuit, numeral 21 a clock signal generator, numerals 22 and 36 AND gates, numeral 23 a frequency divider, numeral 24 a decoder, numeral 25 a monostable multivibrator, numerals 26, 49 and 50 OR gates, numeral 27 a shift pulse generator, numeral 28 a numeric value signal input terminal, numeral 29 a register, numeral 30 a comparator, numerals 31 to 33 memories, numeral 34 a selector circuit, numeral 35 a subtractor, numerals 37, 45 to 48 input/output switching circuits, numeral 38 a shift pulse distributor, numeral 39 a timing pulse generator, numerals 40 to 42 frequency signal oscillators, numeral 43 an amplifier, numeral 44 a transmission transducer, symbols F11 to F34 flip-flops and symbols G11 to G34 AND gates. The characters $a, b, \ldots, u_3$ attached to the lines connecting the circuit components and the gates are for explaining the conditions of the signals in the respective sections.

Figure 8:
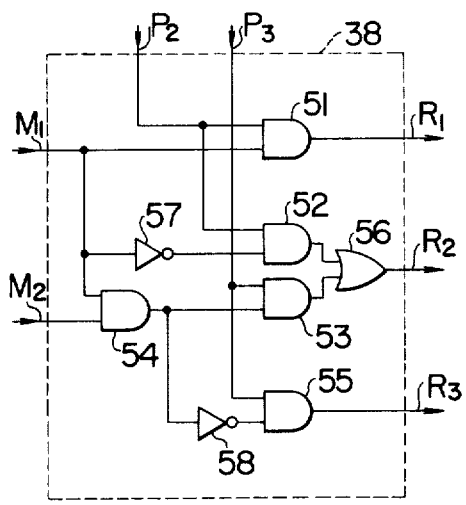

The information to be transferred is introduced to the terminal 28 in the form of numeric value signal $N_i$, and after being converted into FT patterns, sent out by the transducer 44. The memories 31, 32 and 33 are for storing the constants $W_1 (=6)$, $W_2 (=2)$ and $W_3 (=1)$ respectively. Symbols F11 to F34 show flip-flops in the same number of and corresponding to the elements of an FT matrix having three rows of frequency signals and 4 columns of unit time regions the flip-flops being reset at 0 before starting each operation. The output switching circuit shown by the numerals 45 to 48 are such that the signal applied to the terminal I is produced at the terminal 500 when the control signal applied to the terminal S is in the state of 1, and produced at the terminal 600 when the control signal is 0, as shown by (A) of FIG. 7. On the other hand, the input switching circuit shown by reference numeral 37 has a terminal J at which the signal applied to the terminal 700 is produced when the control signal applied to the terminal S is in the state of 1, while the signal applied to the terminal 800 is produced at the terminal J when the control signal is 0. The shift pulse distributor shown by reference numeral 38 has a specific circuit configuration as shown in FIG. 8, in which reference numerals 51 to 55 show AND gates, numeral 56 an OR gate, and numerals 57 and 58 inverters.

Figure 10:
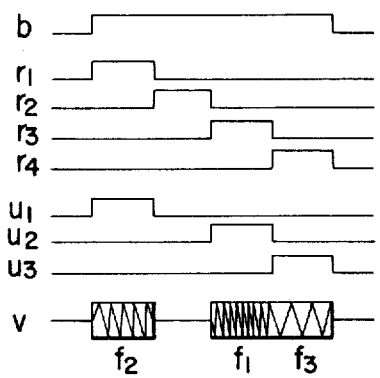
FIGS. 9 and 10 show waveforms for explaining the operation of the transmitter unit.

The operation of the circuit under consideration will be explained with reference to the time charts of FIGS. 9 and 10, assuming that the numeric value information of 9 is given as $N_i$. Even though the numeric value of 9 is a decimal number, the embodiment under consideration is assumed to receive an input of a binary number signal corresponding to the decimal number 9. First, the numeric value $N_i$ applied to the input terminal 28 is applied through the input switching circuit 37 to the register 29, thus producing an output 9 from the output $g$ as shown by the time chart of FIG. 9, when the output $a$ of the sequencing circuit 20 is in the state of 0. When the signal $a$ changes to 1 at the next moment, the clock signal generated in the clock signal generator 21 is introduced through the AND gate 22 in the form of signal shown by $c$. The pulse signal $c$ is frequency-divided by the frequency divider 23 into the pulse signal $d$ which is one-fourth the pulse signal $c$ in frequency. The pulse signal $d$ drives the decoder 24 thereby to produce three decode signals $e$ sequentially. The decode signals $e$ are applied to the selector circuit 34, where the constants 6, 2 and 1 stored in the memories 31, 32 and 33 are selected sequentially and the numeric value signal $h$ is produced. The comparator 30 is for comparing the numeric values of signals $g$ and $h$ with each other and produces the signal K which is in the state of 1 and 0 when the signal $g$ is larger than or equal to the signal $h$ and smaller than the signal $h$, respectively.

Initially, the signals $g$ and $h$ are 9 and 6 respectively, and therefore the signal K is in the state of 1, so that the pulse signal $c$ is passed through the AND gate 36 and produced as the pulse $l$. The pulse $l$ causes the output of the subtractor 35 for subtracting $g$ or $h$ from the other to be read by the register 29 through the input switching circuit 37, with the result that the signal $g$ takes the value 3 since 6 is subtracted from 9. This value $g$ is smaller than the value $h$ and therefore the signal K becomes 0, thus preventing the pulse signal $l$ from being produced. In the event that the constant 2 is selected as the value $h$, on the other hand, the value $g$ is again larger than the value $h$ and therefore, as in the preceding case, the signal K becomes 1, thus producing the pulse $l$, so that the value $g$ takes a new value which is the result of subtraction of $g$ or $h$ from the other, or 1 ($= 3 - 2$). Lastly, in the case where the constant 1 is selected as the value $h$, the pulse $l$ is produced and the subtracting operation performed. As the result of the subtraction, the value $g$ becomes 0, thereby subsequently preventing the pulse $l$ from being produced. Each one pulse $l$ generated in accordance with the values 6, 2 and 1 of the signal $h$ in the above-mentioned process is considered to represent the permutation of numbers [1, 1, 1], when $N_i$ is 9, as will be noted from FIG. 5.

To further facilitate the understanding, the case shown in FIG. 5 involving $N_i = 10$ will be explained. Since the value of $N_i$ of 10 is given, the signal $k$ in the state of 1 is produced as the result of comparison between $g = 10$ and the initially-selected constant $h = 6$ shown in FIG. 6, thereby producing the first pulse ($a$) in the line $l'$. (A train of pulses generated at the output of the register 29 when $N_i$ is 10 is shown by $l'$ at the bottom of FIG. 9.). In view of the fact that the result of subtraction between the values $g$ and $h$ is $4 = (10 - 6)$, no pulse is produced after generation of pulse ($a$). Next, when the value $h$ is selected at the constant 2, the fact that the value of $g$ of 4 is larger than the value $h$ of 2 under that condition causes the pulse ($b$) to be produced at the time point when both values are compared. Also, the result of subtraction between the values $g$ and $h$ is $4 - 2 = 2$ and therefore the constant $h$ of 2 is still selected at this point, with the result that the value $g$ of 2 ($= 4 - 2$) which is the result of subtraction is again compared with the value $h$ of 2. In this case, $g$ is not larger than $h$ and therefore the pulse ($b$) is followed by the pulse ($c$) produced in the line $l'$. Lastly, if the constant $h$ is selected to 1, any of the above-mentioned conditions is not accomplished, so that no pulse is produced.

Figure 9:
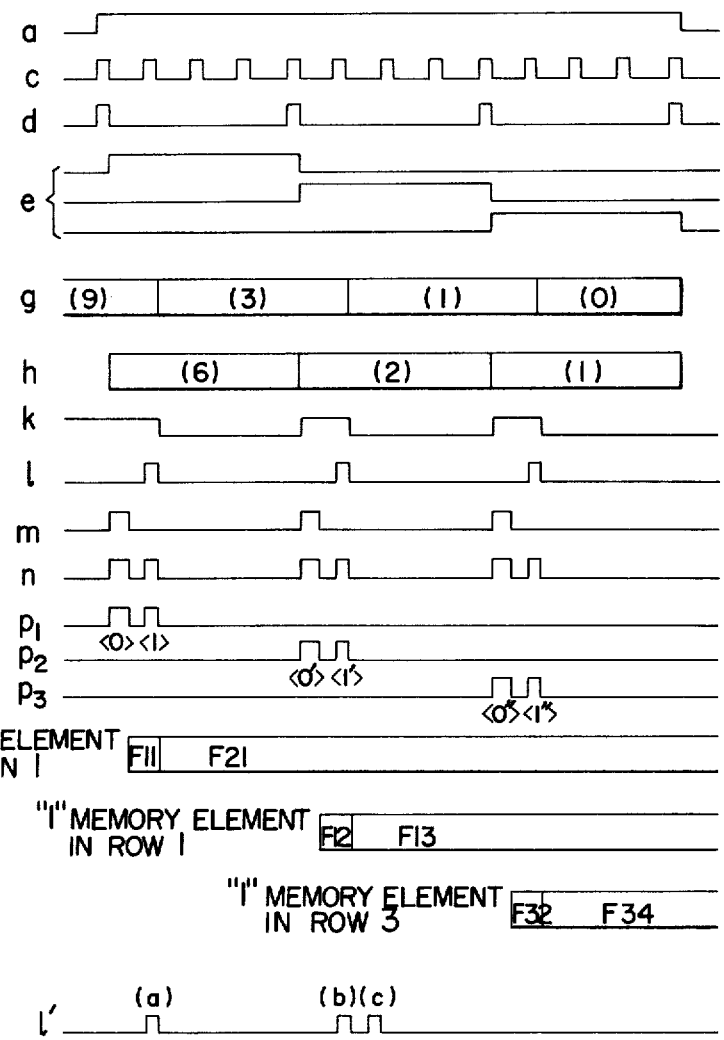

It will thus be noted that the pulse train $l'$ shown in FIG. 9 corresponds to the permutation of numbers [1,2,0] at the $N_i$ value of 10, which makes it clear that the numeric value of each element included in the permutation of the numbers is indicated by the number of pulses produced in the line $l$.

By the way, the subtracting operation in the above-mentioned processes may be considered to be the one in which the dividend $g$ is divided by the divisor $h$ and the pulses $l$ in the number equal to the integral part of the quotient are produced. In such a case, if the value $g$ is smaller than $h$, the integral part of the quotient is zero and therefore no pulse is produced.

Now, the FT matrix based on the permutations of the numbers obtained as mentioned above is numbered in the manner described below in parallel with the aforementioned operation.

The fall of the pulse d drives the monostable multivibrator 25, thereby producing the pulse $m$ having a smaller width than the intervals between pulses $i$. The pulse $m$ is superposed on the pulse $c$ into pulse $n$ in the OR gate 26. The pulse signal $n$ is divided into pulses $P_1$, $P_2$ and $P_3$, as shown in FIG. 9, in the shift pulse generator 27 in response to the decode signal $e$. On the other hand, each of the flip-flops F11 to F34 has an input terminal D, an output terminal Q and a clock input terminal C and operates in such a function that a 1 signal is produced and stored at the output terminal Q and stored at the fall of the clock input signal when both the input signals at the terminals D and C are 1. First, the pulses $P_1$ in the state of <0> are applied to the terminals C of the flip-flops F11, F21 and F31. At the same time, the pulse $m$ from the same source, i.e. the monostable multivibrator 25 is applied to the terminal D of the flip-flop F11, so that a 1 signal is produced only at the terminal Q of the flip-flop F11. Symbol <0> indicates that the state of the pulse $P_1$, $P_2$, or $P_3$ corresponds to the area numbered 0 in (A) of FIG. 4. Similarly, symbols <1>, <0'>, <1'>, <0''> and $<1''>$ are hereinbelow used corresponding to the areas numbered 1, 0', 1', 0'', and 1'' in A of FIG. 4.

In the event of pulse $P_1$ in the state of $<1>$ is applied, by contrast, the flip-flop 21 to which the input signal D is applied from the output terminal Q of the flip-flop F11 is shifted to 1. Since the $<1>$ pulse is followed by no pulse, the value 1 is stored only in the flip-flop F21 upon completion of processing the pulse $P_1$. As a result, the 0 and 1 signals produced at the output terminals Q of the flip-flops F11 and F21 respectively are applied to the terminals $M_1$ and $M_2$ of the shift pulse distributor 18, so that, as shown in the example of circuit configuration of FIG. 8, the input signals $P_2$ and $P_3$ are passed to the outputs $R_1$ and $R_3$ respectively. Consequently, subsequent pulses $P_2$ are supplied to the terminals C of the flip-flops F12, F13 and F14 and subsequent pulses $P_3$ to the terminals C of the flip-flops F32, F33 and F34, but no pulse is supplied to the flip-flops F22, F23 and F24 in the same row as the flip-flop F21 storing the 1 state.

The pulse $P_2$ in the state of $<0']$, on the other hand, similarly causes a 1 pulse to be produced at the output terminal Q of the flip-flop F12, and the 1 state is shifted to and stored in the flip-flop F13 in response to the subsequent pulse in the state of $<1']$. The output signal 1 produced at the terminal Q of the flip-flop F13 is applied through the OR gate 50 to the terminal S of the output switching means 48, so that the output terminal Q of the flip-flop F32 is connected to the input terminal D of the flip-flop F34 over the flip-flop F33.

Since the output signals from the terminals Q of the flip-flops F12 and F22 are both 0 and therefore the output switching means 47 is supplied with a 0 signal at its terminal S through the OR gate 49, with the result that the pulse $m$ is applied to the terminal D of the flip-flop F32 as it is.

The value 1 applied to the flip-flop F32 in response to the pulse $P_3$ in the state of $<0''>$ is stored in the flip-flop 34 over the flip-flop F33 in response to the next pulse in the state of $<1''>$.

In this way, upon completion of processing the pulses $P_1$, $P_2$ and $P_3$, the values 1 are stored in the flip-flops F21, F13 and F34. The first pulses $P_1$, $P_2$ and $P_3$ in the state of $<0>$, $<0'>$ and $<0''>$ are for "marking" the elements zero in the numbering of the aforementioned FT matrix. This marking corresponds to the values 1 applied to the flip-flops associated with the particular elements. The other similar pulses such as in the state of $<1>$, $<1'>$ and $<1''>$ are for sequentially shifting the values 1 acting as a marking signal for the purpose of numbering and quite identical with the aforementioned pulse $l$. In other words, the above-mentioned operation is for registering the values 1 with and thus "marking" those flip-flops among the flip-flops corresponding to the FT matrix which have the same numbers as the number of pulses $l$ indicating the permutations of numbers. Thus, the flip-flops supplied with the values 1 show the presence of frequency signals in the corresponding elements of the FT matrix, so that the FT pattern as shown in A of FIG. 4 is obtained as the pattern of the values stored in the flip-flops.

Upon completion of the aforementioned operation, the signal $a$ in the sequencing circuit 20 is restored to the state of 0, while the signal $b$ becomes 1. The timing pulse generator 39, in response to the signal $b$, produces a series of timing pulses $r_1$, $r_2$, $r_3$ and $r_4$ in that order as shown in the time chart of FIG. 10, G11 and G34 show AND gates for producing logic products of the timing pulses $r_1$ to $r_4$ and the Q output signals of the flip-flops F11 to F34 respectively. As a result, signals $u_1$, $u_2$ and $u_3$ are produced, which drive the oscillators 40, 41 and 42 thereby to generate the frequency signals $f_1$, $f_2$ and $f_3$ respectively. These frequency signals are superposed one on another and amplified by the amplifier 43 into the signal $v$ as shown in FIG. 10. The signal $v$ is analogous to the one shown in A of FIG. 2 and identical with the FT pattern shown in A of FIG. 4. The signal $v$ is then propagated in a form of ultrasonic wave from the transmitting transducer 44. The FT pattern indicated by the values 1 and 0 of the outputs of the flip-flops is thus converted into frequency signals.

The numeric value information $N_i$ applied to the input terminal 28 is thus picked up at the transmitting transducer 24 in the form of corresponding FT patterns.

Even though the above-mentioned embodiment employs the three frequency signals and four unit time regions shown in FIG. 3 to facilitate the understanding, the invention is not necessarily limited to such a case but may be applied also to the case involving a greater number of frequency signals or unit time regions to increase a greater amount of information transferred.

It will be understood from the foregoing description that given numeric information is converted into a plurality of FT patterns successively and transmitted at the time intervals $T_r$ determined by the sequencing circuit 20.

Explanation will be made now of the receiving unit which receives the transmitted signal in the form of B of FIG. 2. It was already mentioned that each FT pattern is reproduced at the receiver unit 2 by detecting the unit time region to which the rise point of each frequency component belongs.

Figure 11:
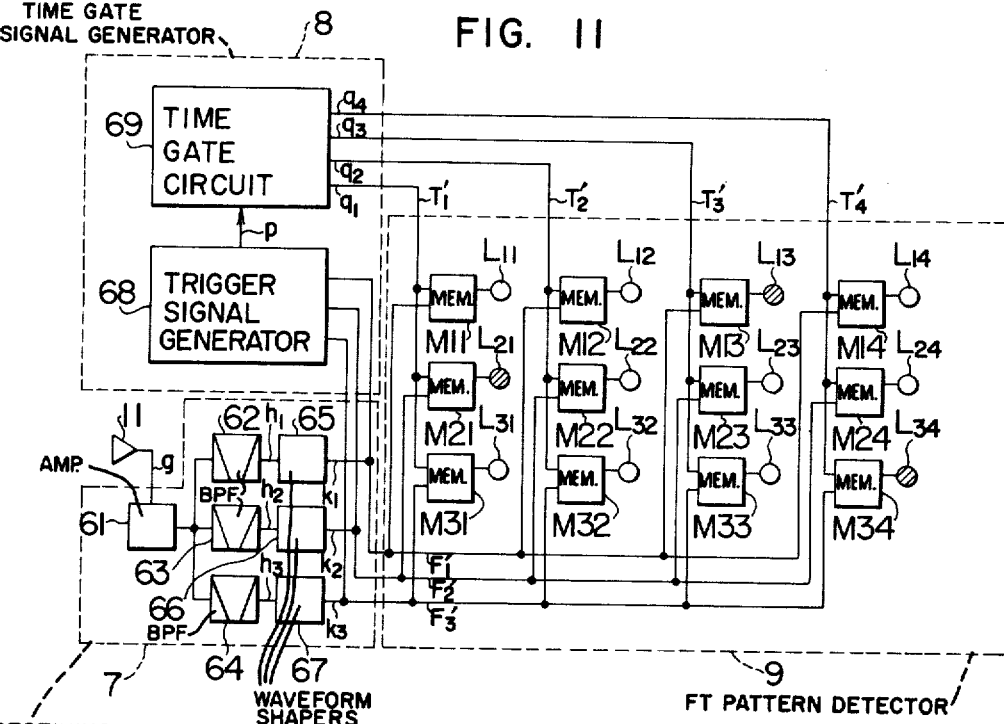
FIG. 11 is a block diagram showing an embodiment of the receiver unit.

A specific example of the circuit configuration of the receiver unit 2 of FIG. 3 is shown in FIG. 11. Reference numeral 61 shows an amplifier, numerals 62 to 64 band-pass filters, and numerals 65 to 67 waveform shapers, the elements 61 to 67 making up a receiving circuit 7. The amplifier 61 is for amplifying the signal group $g$ received by the wave receiver 11. The band-pass filters 62 to 64 separate the signal group $g$ into the frequency components $f_1$, $f_2$ and $f_3$. The waveform shapers 65 to 67 rectify and differentiate the separated frequency components $f_1$, $f_2$ and $f_3$ thereby to produce and apply to the frequency detection signal lines $F_1'$, $F_2'$ and $F_3'$ the detection pulses associated with the rise points of the respective signals. Reference numeral 68 shows a trigger signal generator, and numeral 69 a time gate circuit, the component elements 68 and 69 making up a time gate signal generator 8. The trigger signal generator 68 is for picking up the detection pulse for the first frequency signal and applying a trigger pulse to the time gate circuit 69 at that time point. The output terminals of the time gate circuit 69 are connected to the time gate signal lines $T_1'$, $T_2'$, $T_3'$ and $T_4'$. Symbols M11 to M34 show memory elements such as flip-flops, each of which is supplied with a couple of inputs, one from the frequency signal line $F_1'$, $F_2'$ or $F_3'$ and the other from the time gate signal line $T_1'$, $T_2'$, $T_3'$ or $T_4'$, thus forming an FT matrix as a whole. Each of the memory elements has a function to store and produce a signal in the logic state of 1 when both the input signals thereto are 1. Symbols L11 to L34 show lamps connected to the output terminals of the memory units respectively and which are turned on when the output signals of the memory elements are in the state of 1.

The memory elements M11 to M34 and the lamps L11 to L34 make up the FT pattern detector 9.

The operation of the receiving circuit 2 having the above-mentioned circuit configuration will be explained below with reference to the time chart of FIG. 12.

Figure 12:
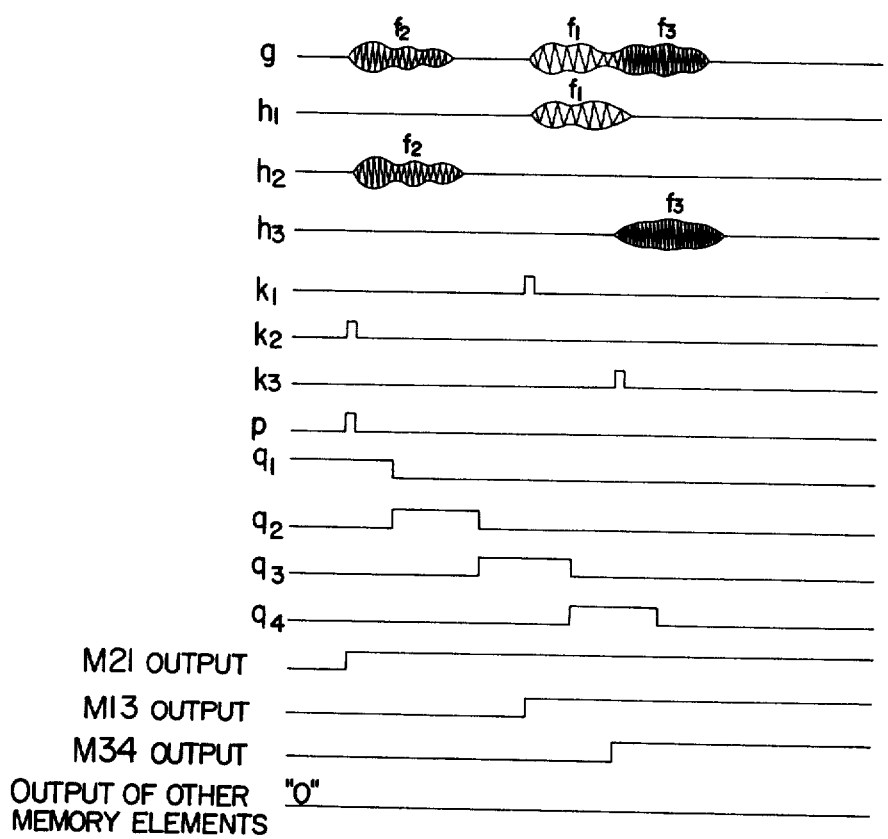
FIG. 12 shows waveforms for explaining the operation of the receiver unit.

Assume that the signal g shown in FIG. 12 is received by the wave receiver 11. This signal, like the signal in B of FIG. 2, is derived from a change in the waveform of the transmitted signal group g in the course of propagation thereof. The signal g is applied through the amplifier 61 to the filters 62, 63 and 64 where they are separated and converted into the signals $h_1$, $h_2$ and $h_3$ respectively having the frequency components $f_1$, $f_2$ and $f_3$. Further, the outputs from the filters are rectified and differentiated by the waveform shapers 65, 66 and 67 into pulses $k_1$, $k_2$ and $k_3$ representing the rise points of the frequency signals. The trigger signal generator 68 picks up the pulse $k_2$ detecting the first frequency signal $f_2$, and applies a trigger pulse p to the time gate circuit 69, which in turn applies gate signals $q1$, $q2$, $q3$ and $q4$ to the time gate signal lines $T_1'$, $T_2'$, $T_3'$ and $T_4'$ at intervals corresponding to the unit time region of the FT matrix with the trigger pulse as a reference. The gate signals $q_1$, $q_2$, $q_3$ and $q_4$ are applied to one of the input terminals of the memory elements included in the groups M11 to M31, M12 to M32, M13 to M33 and M14 to M34 respectively making the columns of the FT matrix. On the other hand, the detection pulses $k_1$, $k_2$ and $k_3$ are applied through the frequency detection signal lines $F_1'$, $F_2'$ and $F_3'$ to the other input terminals of the memory elements of the groups M11 to M14, M21 to M24, and M31 to M34 making up the rows of the FT matrix. First, the detection pulse $k_2$ for the first frequency signal $f_2$ arrives when the time gate signal is in the state of 1, so that the output of the memory element M21 is 1 at that time thus turning on the lamp L21. In like manner, the memory elements M13 and M34 to the two input terminals of which are simultaneously applied 1 signals produce 1 signals thereby to turn on the lamps L13 and L34. The memory elements M21, M13 and M34 producing these 1 signals are located at positions corresponding to the shortcircuited intersections of the FT pattern generator of the transmitter unit 1 and represent the same FT pattern.

In this way, the frequency signal groups g received are converted into FT patterns in the form of memory patterns of the memory element groups making up the FT matrix. Such patterns are easily recognized by watching the turning on of the lamps connected to the memory elements, thus making possible the identification of the unit information received.

Subsequently, by repeating the operation of transmitting and receiving the unit information pieces in similar fashion at appropriate time intervals, the information comprising the unit information pieces is successfully transferred.

It will thus be understood that, according to the present invention, each unit information piece is expressed by an FT pattern comprising a combination of frequencies and time, and the information comprising a plurality of such unit information pieces is transferred, thereby realizing a novel information transmitting and receiving device. The transmitting and receiving system according to the invention is applicable not only to the radio communication on the ground but also to the underwater ultrasonic communication and wire telegraphy. Further, as compared with the conventional FSK system, the system under consideration makes possible the transmission of unit information within a short time as well as the information transfer at high speed with short time intervals.

If the system under consideration is applied to the underwater information transfer, therefore, it is possible to achieve a high-speed reliable underwater information transfer. In the application fields of the underwater information transfer including remote control of underwater equipment or submerged units and communication between submerged units, the especially important problems of multi-path effect and reverberation in water and the resulting interferences and operation errors are all solved by the device according to the invention at a time when the underwater work is complicated and demands high speed. The device according to the invention, therefore, has a wide field of application and the practical value thereof is very great.

We claim:

1. An imformation transmitting and receiving device comprising, in combination:

a transmitter unit for encoding and transmitting a piece of data to be transmitted as a frequency signal-time pattern, said pattern being comprised of a plurality $n-1$ of frequency signals, different from each other and each of which has a duration corresponding to a prescribed time interval $t$, and an additional time interval $t$ occupied by no frequency signal, so that said frequency signal-time pattern occupies $n$ sequential time intervals, $n-1$ of which contain signals of respectively different frequencies, and wherein the leading interval of time is occupied by one of said plurality $n-1$ of frequency signals; and a receiver unit for receiving the piece of data encoded and transmitted by said transmitter unit, for detecting the frequency signal-time pattern, and for decoding the order of the frequency signals as contained within said pattern.

2. An information transmitting and receiving device according to claim 1, wherein said transmitter unit includes a first section receiving a respective piece of data in the form of numeric information and converting said numeric information into a pulse train corresponding to said frequency-time pattern, a second section storing the pulses contained in said pulse train, and a third section, responsive to the output of said second section, for generating said frequency signals during successive respective intervals of time.

3. An information transmitting and receiving device according to claim 2, wherein said first section contains first means for comparing said numeric information with a first predetermined constant, and second means for supplying to said first means a value equivalent to said numeric information minus said first predetermined constant when said first means produces its output indicating the said numeric information is larger than said first predetermined constant and for supplying to said first means a second predetermined constant smaller than said first predetermined constant when said first means produces its output indicating that said numeric information is smaller than said first predetermined constant.

4. An information transmitting and receiving device according to claim 1, wherein said receiver unit includes
- a first unit having a plurality of receiving elements of the same number as said frequency signals for independently detecting said respective frequency signals,
- a second section, responsive to the output from one of said receiving elements, for producing output signals at intervals corresponding to said successive time intervals respectively, and
- a third section, responsive to the outputs of said first section and the outputs of said second section, for reproducing said frequency signal-time pattern.

5. A method of communication between transmitter and receiver stations comprising the steps of
- a. encoding and transmitting, at said transmitter station, individual pieces of data, each as a respective frequency signal-time pattern, said pattern being comprised of a plurality $n-1$ of frequency signals, different from each other and each of which has a duration corresponding to a prescribed time interval $t$, and
  an additional time interval $t$ occupied by no frequency signal,
  so that said frequency signal-time pattern occupies $n$ sequential time intervals
  $n-1$ of which contain signals of respectively different frequencies, and
  wherein the leading interval of time is occupied by one of said plurality $n-1$ of frequency signals;
- b. receiving, at said receiver station, each piece of data as encoded and transmitted at said transmitter station;
- c. detecting each frequency signal-time pattern of which the respective pieces of data are formed; and
- e. decoding the order of the frequency signals contained within each pattern to thereby recover the originally encoded pieces of data.

* * * * *